June 14, 1932.                 P. FOX                      1,863,475
              MOTOR VEHICLE FENDER AND RUNNING BOARD
                    Filed May 5, 1931        2 Sheets-Sheet 1
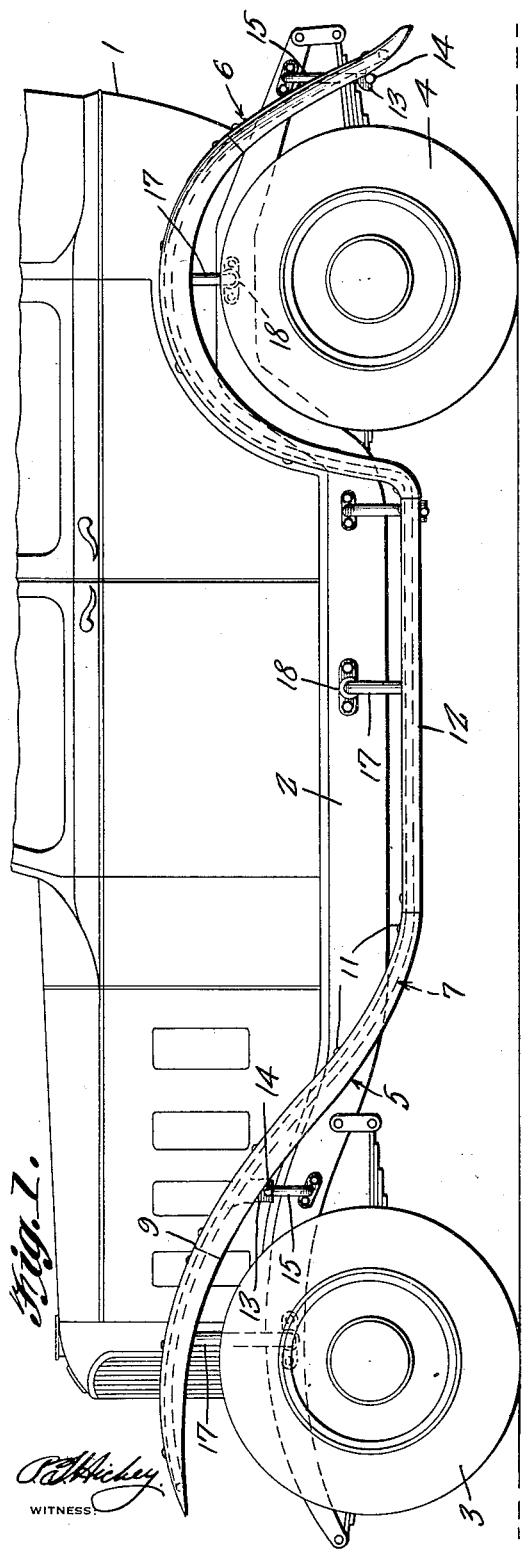
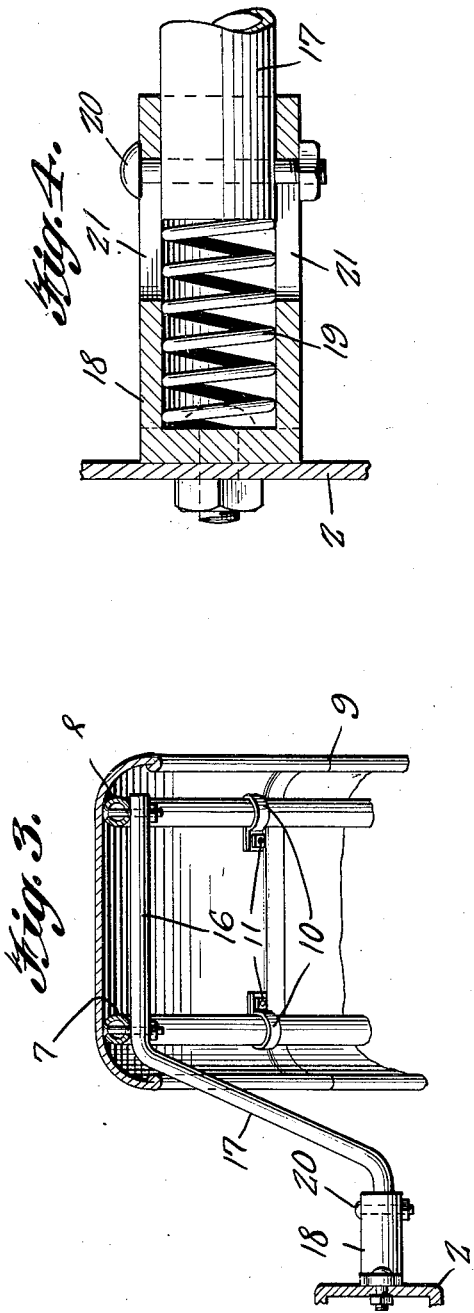
Philip Fox,          INVENTOR
    BY Victor J. Evans
         and Co. ATTORNEYS June 14, 1932. P. FOX 1,863,475
MOTOR VEHICLE FENDER AND RUNNING BOARD
Filed May 5, 1931 2 Sheets-Sheet 2
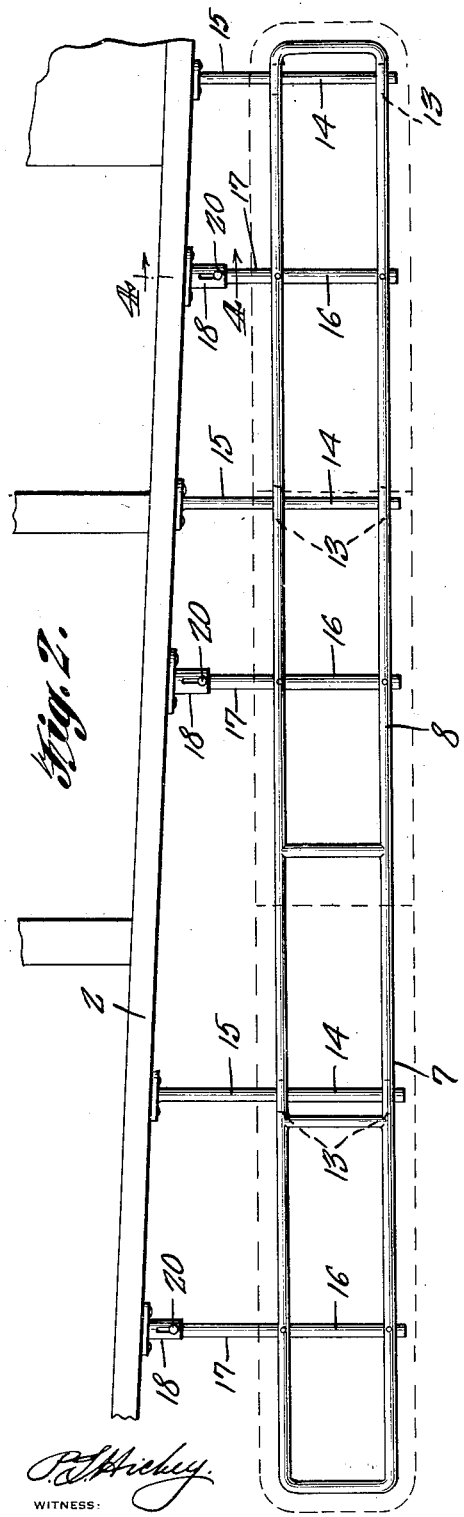
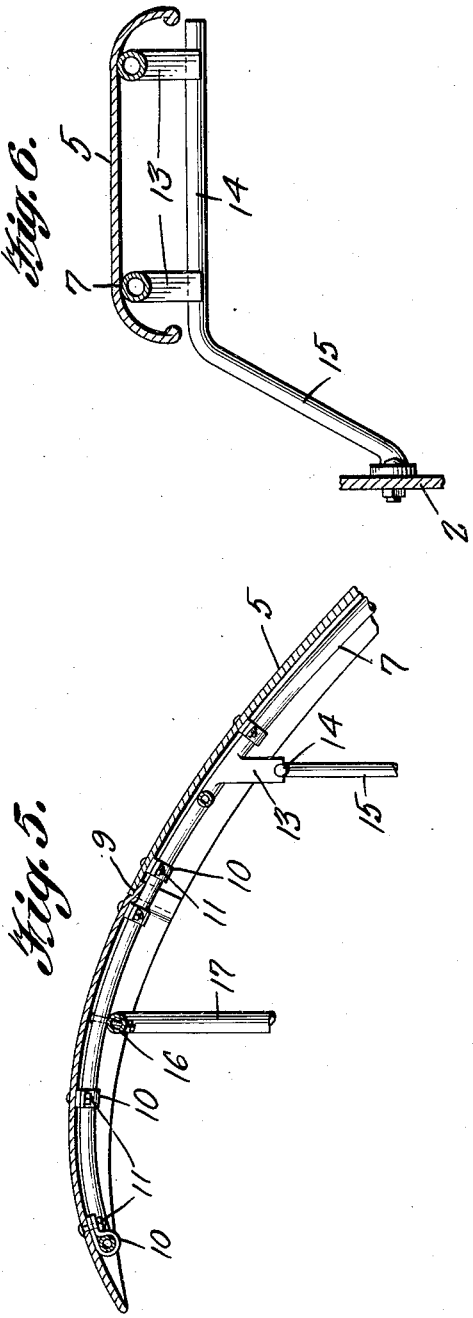
Philip Fox, INVENTOR
BY Victor J. Evans and Co. ATTORNEYS Patented June 14, 1932

1,863,475

UNITED STATES PATENT OFFICE

PHILIP FOX, OF BROOKLYN, NEW YORK

MOTOR VEHICLE FENDER AND RUNNING BOARD

Application filed May 5, 1931. Serial No. 535,240.

This invention relates to fenders or mud guards for motor vehicles and has for the primary object, the provision of a device of the above stated character which will be sturdy and provide an efficient protection to the vehicle when in a collision or accident and which may be easily and quickly assembled and disassembled when desired.

Another object of this invention is the provision of combined fenders and running boards constructed from a plurality of sections detachably connected, whereby any one of the sections may be removed from the other section when desiring to make a repair or replacement in case of damage received in an accident.

A further object of this invention is the provision of a novel means for mounting the fenders and running boards or steps to the vehicle frame, whereby such parts may be made to yield and act as a cushion protection to the vehicle during an accident.

A further object of this invention is the provision of a sectional frame or mounting for supporting the sectional fender which provides a rigid and durable construction and permits the fender sections to be manufactured from a lighter grade of material than ordinarily employed in motor vehicle construction.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary side elevation illustrating a motor vehicle with my invention applied thereto.

Figure 2 is a fragmentary plan view illustrating a supporting frame.

Figure 3 is a transverse sectional view illustrating a frame with the fender sections mounted thereon.

Figure 4 is a detail sectional view taken on the line 4—4 of Figure 2.

Figure 5 is a detail sectional view illustrating a support between the fender frame and the vehicle frame.

Figure 6 is a transverse sectional view illustrating the slidable connection between the fender frame and the support.

Referring in detail to the drawings, the numeral 1 indicates the body of a motor vehicle mounted on the chassis or frame 2 and which is supported by the front and rear wheels 3 and 4. Front and rear fenders 5 and 6 are disposed over the front and rear wheels as customary in motor vehicle construction and each includes fender frames 7 connected by a running board frame 8. The frames 7 and 8 are preferably constructed of tubular metal joined by couplings whereby the frame may be easily assembled. The fenders are preferably constructed from a light grade of material having the conventional type of design now in use and each is constructed from sections having their adjacent ends arranged in overlapped relation as shown at 9. The sections of the fenders are secured to the frames by clamps 10 and bolts 11 permitting any one of the sections to be removed for repair or replacement when desired. The running board 12 is constructed of a similar material to the fenders and mounted on the running board frame 8 similar to mounting the fenders on the fender frame 7. The frames have grooved lugs 13 slidably receiving supports 14 by resting thereon and the supports are provided with angularly disposed portions 15 bolted or otherwise secured to the frame 2 of the motor vehicle.

Arms 16 are secured to the frames 7 and 8 and have angularly related portions 17 slidably received in sleeves 18 carried by the chassis or frame 2. Cushion springs 19 are mounted in the sleeves and bear against the ends of the angularly related portions 17 of the arms 16 for the purpose of yieldably and cushionably supporting the fenders and running boards to the vehicle. The angularly related ends 17 of the arms 16 are slidably secured within the sleeves by bolts 20 extending through slots 21 in the sleeves.

In the case of the fenders being struck or engaged in an accident, they will yield due to the cushion springs 19 and absorb a portion of the shock or jar and aid in preventing the respective vehicle from being injured, and should any of the sections of the fenders, running boards or frames be injured in an accident, the injured section can be easily removed for repair or replacement. The fenders and running boards when applied to the vehicle will have the appearance or general design now in vogue in automobile or motor vehicle construction.

While I have shown and described the preferred embodiment of my invention, it will be understood that minor changes in construction, combination and arrangement of parts may be made without departing from the spirit and scope of my invention, as claimed.

Having thus described my invention, what I claim is:

A fender for motor vehicles comprising a frame including curved end portions to be positioned over the front and rear wheels of a vehicle and a straight medial portion, mud guards secured to said curved portions, a running board secured to the straight portion and engaging the adjacent ends of the mud guards, brackets carried by the frame, supporting elements secured to the vehicle and slidably received by the brackets, supporting arms fixed to the frame, and cushion means yieldably securing the arms to the vehicle.

In testimony whereof I affix my signature.

PHILIP FOX.